(12) United States Patent
Wu et al.

(10) Patent No.: US 11,796,891 B2
(45) Date of Patent: Oct. 24, 2023

(54) OPTICAL DRIVING MECHANISM

(71) Applicant: TDK TAIWAN CORP., Taoyuan (TW)

(72) Inventors: Fu-Yuan Wu, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 413 days.

(21) Appl. No.: 16/778,342

(22) Filed: Jan. 31, 2020

(65) Prior Publication Data

US 2020/0249420 A1    Aug. 6, 2020

Related U.S. Application Data

(60) Provisional application No. 62/799,886, filed on Feb. 1, 2019.

(51) Int. Cl.
*G02B 7/09* (2021.01)
*G02B 27/64* (2006.01)
(Continued)

(52) U.S. Cl.
CPC ............... *G03B 9/06* (2013.01); *G02B 7/08* (2013.01); *G02B 7/09* (2013.01); *G02B 27/646* (2013.01); *G03B 5/06* (2013.01); *G03B 13/36* (2013.01); *G03B 30/00* (2021.01); *G03B 2205/0023* (2013.01); *G03B 2205/0069* (2013.01); *H04N 23/57* (2023.01); *H04N 23/687* (2023.01)

(58) Field of Classification Search
CPC . G03B 5/00; G03B 5/06; G03B 13/32; G03B 13/34; G03B 13/36; G03B 2205/0007; G03B 2205/0053; G03B 2205/0069; G03B 3/02; G03B 3/10; G03B 5/04; G03B 30/00; G02B 7/021; G02B 7/08; G02B 7/09; G02B 7/10; G02B 9/62; G02B 13/001; G02B 13/0065; G02B 27/646; H04N 5/2253; H04N 5/2254; H04N 5/2257; H04N 5/23287; H04N 5/23258; H02K 11/33; H02K 41/0356
USPC ....... 359/911, 425, 554, 555, 557, 696, 698, 359/811, 813, 814, 823, 824, 872, 877; 396/52, 53
See application file for complete search history.

(56) References Cited

U.S. PATENT DOCUMENTS

2018/0017844 A1* 1/2018 Yu .............................. G02B 7/08
2019/0196140 A1* 6/2019 Kajimura ........... G01D 5/34784

* cited by examiner

*Primary Examiner* — Marin Pichler
(74) *Attorney, Agent, or Firm* — Muncy, Geissler, Olds & Lowe, P.C.

(57) ABSTRACT

An optical driving mechanism is provided, including a fixed portion, a movable portion, a drive assembly, and a position sensing assembly. The movable portion is movably connected to the fixed portion and configured to carry a first optical element. The drive assembly is configured to drive the movable portion relative to the fixed portion to move within a limited range including a first range and a second range. The position sensing assembly is configured to sense the movement of the movable portion, and includes a reference element, a first position sensing element, and a second position sensing element. The first and second position sensing elements respectively correspond to the reference element in the first and second ranges, wherein a first position sensing surface of the first position sensing element and a second position sensing surface of the second position sensing element are arranged in a first direction.

20 Claims, 6 Drawing Sheets

(51) Int. Cl.
    G03B 9/06     (2021.01)
    G02B 7/08     (2021.01)
    *G03B 13/36*     (2021.01)
    *G03B 5/06*     (2021.01)
    *G03B 30/00*     (2021.01)
    *H04N 23/57*     (2023.01)
    *H04N 23/68*     (2023.01)

US 11,796,891 B2

OPTICAL DRIVING MECHANISM

CROSS REFERENCE TO RELATED APPLICATIONS

This application claims the benefit of U.S. Provisional Application No. 62/799,886, filed on Feb. 1, 2019, the entirety of which are incorporated by reference herein.

BACKGROUND OF THE INVENTION

Field of the Invention

The application relates in general to an optical driving mechanism, and in particular to an optical driving mechanism that includes a position sensing assembly.

Description of the Related Art

Thanks to ongoing technological developments, recent electronic devices (such as tablet computers and smartphones) usually include a lens module capable of aiding in photography or recording video, and some are even equipped with dual lens modules, bringing users a wealth of visual enjoyment. However, an image may come out blurry if the user shakes the lens module in the electronic device when using it. To improve image quality, it is increasingly important to design an effectively shockproof lens module. In addition, designers are currently pursuing miniaturization of such devices, and it is expected that electronic products will be smaller and lighter with each successive generation, and have more powerful zoom system. Therefore, how to design an optical mechanism with a better optical compensation function and a smaller volume through a special configuration is an important issue.

BRIEF SUMMARY OF INVENTION

To address the deficiencies of conventional products, an embodiment of the invention provides an optical driving Mechanism, including a fixed portion, a movable portion, a drive assembly, and a position sensing assembly. The movable portion is movably connected to the fixed portion and is configured to carry a first optical element. The drive assembly is configured to drive the movable portion relative to the fixed portion to move within a limited range, which includes a first range and a second range. The position sensing assembly is configured to sense the movement of the movable portion relative to the fixed portion, and includes a reference element, a first position sensing element, and a second position sensing element. The first position sensing element corresponds to the reference element in the first range, and the second position sensing element corresponds to the reference element in the second range, wherein a first position sensing surface of the first position sensing element and a second position sensing surface of the second position sensing element are arranged in a first direction.

In some embodiments, the drive assembly includes a magnetic element, having an arched shaped structure and disposed on an inner wall of a housing of the fixed portion.

In some embodiments, the drive assembly includes a magnetic element, wherein the magnetic element has an opening which faces the position sensing assembly.

In some embodiments, the fixed portion includes a guiding structure provided near the opening and configured to guide the movable portion relative to the fixed portion to move in the first direction.

In some embodiments, the guiding structure has a plurality of guiding members configured to guide the movable portion relative to the fixed portion to move in the first direction, wherein the position sensing assembly is located between the guiding members when viewed from the first direction.

In some embodiments, the magnetic element overlaps the movable portion and the position sensing assembly in a second direction that is perpendicular to the first direction.

In some embodiments, the fixed portion includes a guiding structure, the movable portion has a connecting member, and the guiding structure passes through the connecting member.

In some embodiments, the connecting member abuts an inner wall of a housing of the fixed portion.

In some embodiments, the connecting member is located on a lower side of a main body of the movable portion and includes two connecting sub-members, which are located on both sides of the main body of the movable portion and are adjacent to the position sensing assembly.

In some embodiments, the connecting member is located on an upper side of a main body of the movable portion and includes two connecting sub-members, which are located on both sides of the main body of the movable portion and away from the position sensing assembly.

In some embodiments, the fixed portion includes a guiding structure, and a magnetic element of the drive assembly is disposed between the guiding structure and the position sensing assembly.

In some embodiments, the diving assembly further includes a plurality of magnetic elements, and the movable portion is located between the magnetic elements.

In some embodiments, the drive assembly includes a plurality of independent magnetic elements, and the magnetic elements are arranged around a center point and around the movable portion.

In some embodiments, the drive assembly includes a coil, and the coil carries a part of the position sensing assembly.

In some embodiments, the guiding structure has a plurality of elongated guiding members extending in the first direction and for guiding the movable portion to move relative to the fixed portion in the first direction, and at least part of the drive assembly is disposed between the guiding members.

In some embodiments, when the movable portion moves within the first range, the signal output by the first position sensing element has a linear relationship with the range of motion of the movable portion, and when the movable portion moves within the second range, the signal output by the first position sensing element has a non-linear relationship with the range of motion of the movable portion.

In some embodiments, when the movable portion moves within the second range, the signal output by the second position sensing element has a linear relationship with the range of motion of the movable portion, and when the movable portion moves within the first range, the signal output by the second position sensing element has a non-linear relationship with the range of motion of the movable portion.

In some embodiments, in a direction parallel to an optical axis of the optical driving mechanism, the first optical element is smaller in size than the second optical element.

In some embodiments, the optical driving mechanism has an optical axis, and when the drive assembly receives a driving signal, the drive assembly drives the movable portion to Move forward and backward along the optical axis.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical mechanisms are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
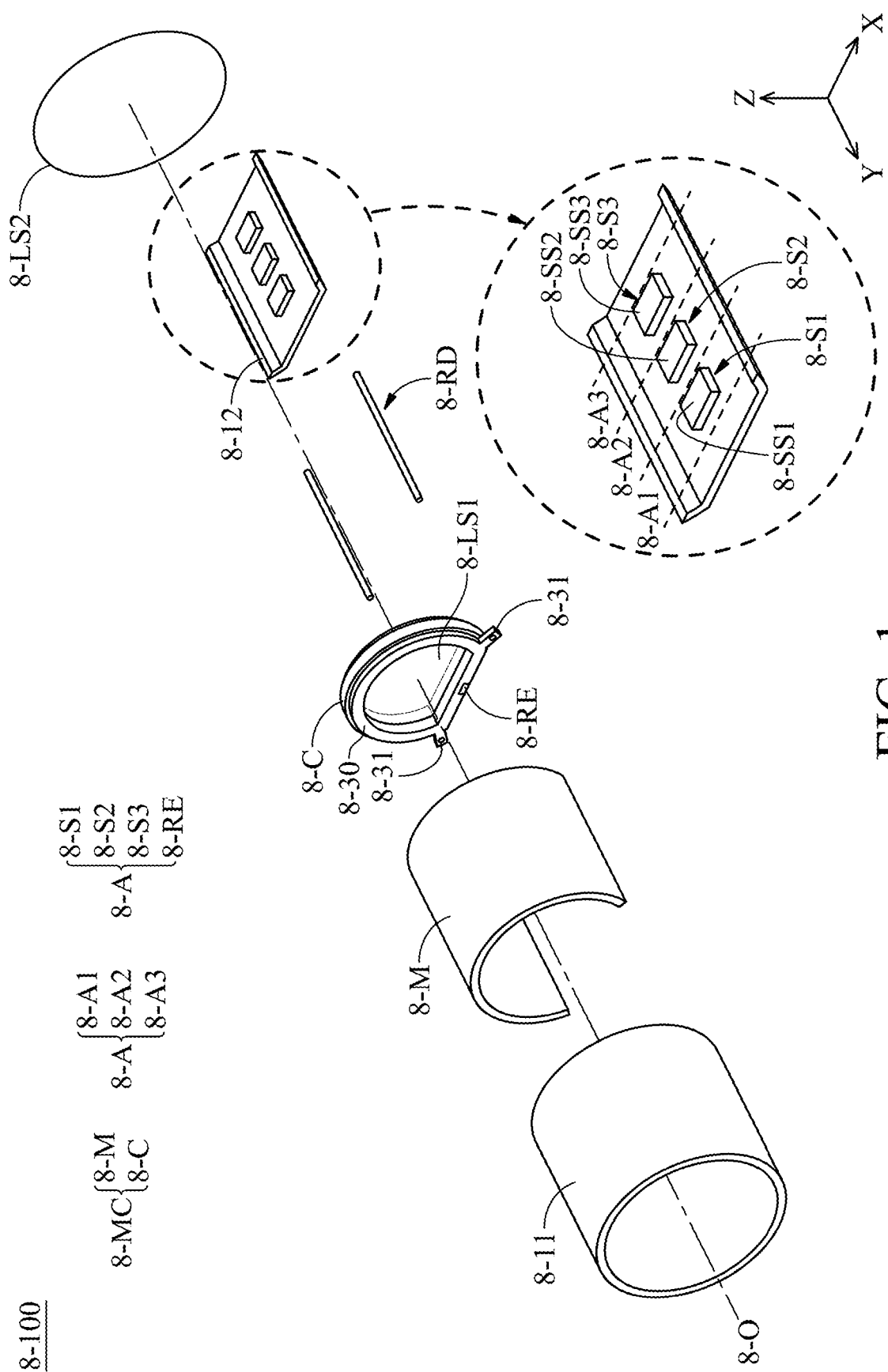
FIG. 1 is a schematic exploded diagram of an optical driving mechanism according to an embodiment of the present invention.
Figure 2A:
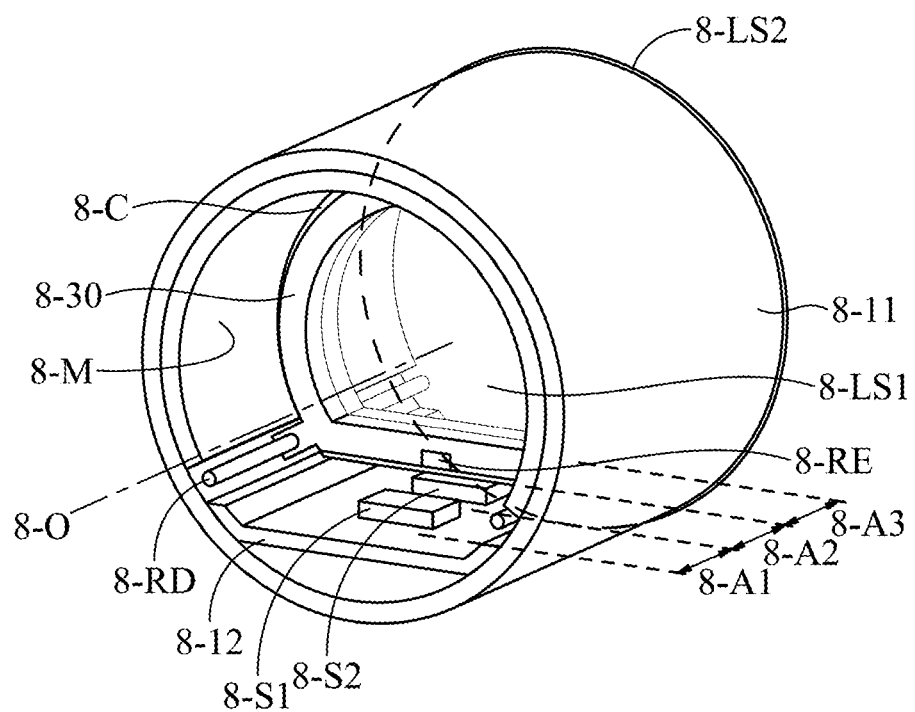
FIG. 2A is a schematic diagram of the optical driving mechanism in FIG. 1 after it has been assembled.

Referring to FIGS. 1 and 2A, FIG. 1 is a schematic exploded diagram of an optical driving mechanism 8-100, and FIG. 2 is the optical driving mechanism 8-100 in FIG. 1 after assembly. The optical driving mechanism 8-100 can be disposed inside a camera module of an electronic device (such as a camera, a tablet or a mobile phone), as a mechanism in the camera module which can provide photographing and video functions. When light (incident light) from the outside enters the optical driving mechanism 8-100 in the camera module, by the optical lens driven via the optical driving mechanism 8-100, the light can pass through a first optical elements 8-LS1 (such as a lens element or a lens assembly including a plurality of lens elements), and then pass through a second optical element 8-LS2 to an image sensor to obtain an image. The first optical element 8-LS1 can be moved relative to the second optical element 8-LS2 to achieve optical zooming, auto-focusing (AF) or optical image stabilization (OIS). The detailed structure of the aforementioned optical drive mechanism 8-100 will be described below.

The optical driving mechanism 8-100 includes a fixed portion 8-10, a movable portion 8-30, a drive assembly 8-MC, and a position sensing assembly 8-S. The fixed portion 8-10 includes a housing 8-11, a carrying plate 8-12, and a second optical element 8-LS2. The housing 8-11 has a hollow cylindrical or elliptical column structure, and the carrying plate 8-12 is located and fixed in the housing 8-11. The second optical element 8-LS2 is fixed to one end of the housing 8-11. The movable portion 8-30, the drive assembly 8-MC and the position sensing assembly 8-S are disposed in the housing 8-11, and can be protected by the housing 8-11. In some embodiments, the second optical element 8-LS2 may be independent of the fixed portion 8-10, but fixed to the fixed portion 8-10. In some embodiments, in a direction parallel to the optical axis 8-O of the optical driving mechanism 8-100, the size of the first optical element 8-LS1 is smaller than the size of the second optical element 8-LS2.

The fixed portion 8-10 further includes a guiding structure 8-RD. In this embodiment, the guiding structure 8-RD has a plurality of (two) elongated strip-shaped guiding members. With the optical axis 8-O as the center, the two are respectively arranged on both sides of the housing 8-41, and can be used to guide the movable portion 8-30 to move relative to the fixed portion 8-10. The movable portion 8-30 includes a connecting member 8-31, which is movably connected to the guiding structure 8-RD of the fixed portion 8-10 and abuts the inner wall of the casing 8-11. In this embodiment, the connecting member 8-31 has a hollow structure, and the guiding structure 8-RD passes through the hollow structure of the connecting member 8-31, so that the movable portion 8-30 can be disposed on the guiding structure 8-RD, and can move along the long axis direction of the guide structure 8-RD (or along the optical axis 8-O). In this embodiment, the connecting member 8-31 is located on the lower side of the main body of the movable portion 8-30, and includes two connecting sub-members. The two guiding members of the guide structure 8-RD respectively pass through the two connecting sub-members which are located on both sides of the main body of the movable portion 8-30 and adjacent to the position sensing assembly 8-S, or the connecting sub-members are located below the optical axis 8-O and adjacent to the position sensing assembly 8-S.

The movable portion 8-30 may be a holder for carrying the first optical element 8-LS1. The drive assembly 8-MC is disposed on the movable portion 8-30 and the housing 8-11, and is used to drive the portion 8-30 and the first optical element 8-LS1 to move relative to the fixed portion 8-10, to adjust the posture or the position of the movable portion 8-30 with the first optical element 8-LS1 of the LS, and thus achieves the purpose of zooming, optical auto-focusing (AF) or optical image stabilization (OIS).

In detail, the drive assembly 8-MC may be an electromagnetic drive assembly, which includes a coil 8-C and a magnetic element 8-M, which are respectively disposed on the movable portion 8-30 and the housing 8-11. The magnetic element 8-M and the coil 8-C correspond to each other, and a gap 8-G is between them. When a driving signal is applied to the drive assembly 8-MC (for example, a current is applied to the coil 8-C by an external power source), a magnetic force is generated between the magnetic element 8-M and the coil 8-C, which can drive the movable portion 8-30 moves with respect to the fixed portion 8-10. In this way, when the drive assembly 8-MC receives a drive signal, the drive assembly 8-MC drives the movable portion 8-30 with the first optical element 8-LS1 to move back and forth along the optical axis 8-O, so as to achieve optical image stabilization, autofocus or change of focal length efficacy. The drive assembly 8-MC in this embodiment is a moving coil type, and in another embodiment, it may be a moving magnetic type. In this embodiment, the drive assembly 8-MC can drive the movable portion 8-30 relative to the fixed portion 8-10 to move within a limited range 8-A, which will be described in more detail later.

In this embodiment, the aforementioned magnetic element M has an arched-shaped, or arc-shaped structure, and is affixed to fit on the inner wall of the housing 8-11, and surrounds the movable portion 8-30. The shape of the magnetic element M is like a tunnel. The magnetic element 8-M has an opening 8-MO, and the opening direction of the opening 8-MO is toward the position sensing assembly 8-S.

In some embodiments, the optical driving mechanism 8-100 may further include a permeability element disposed between the housing 8-11 and the magnetic element 8-M, so that the magnetic force of the magnetic element 8-M can be concentrated in a predetermined direction to enhance the magnetic force of the drive assembly 8-MC driving the movable portion 8-30, and reduce the effect of magnetic interference. In another embodiment, the permeability element can be embedded in housing 8-11, or the housing 8-11 has permeability material, which can strengthen the magnetic force (between the magnetic element 8-M and the coil 8-C) in a predetermined direction, and the overall mechanical strength of the fixed portion 8-10 can be enhanced.

The aforementioned position sensing assembly 8-S may be a position sensor. For example, it may be a magnetoresistive sensor (MRS) or an optical sensor, which is used to sense the relative positional relationship between the movable portion 8-30 and the fixed portion 8-10, to facilitate a control unit (not shown) adjusting the positions between the two by the drive assembly 8-MC.

Figure 3:
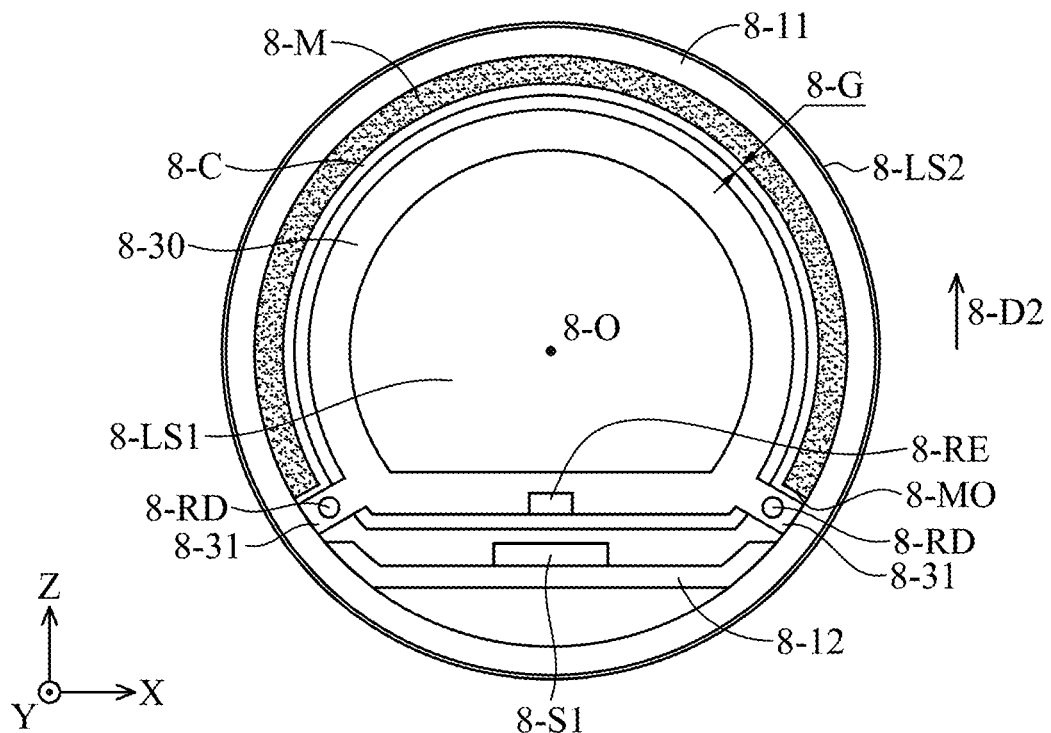
FIG. 3 is a front view diagram of the optical driving mechanism in FIG. 2A.

Referring to FIGS. 1, 2A, and 3, in this embodiment, the position sensing assembly 8-S has three position sensing elements: a first position sensing element 8-S1, and a second position sensing element 8-S2 and the third position sensing element 8-S3, and a reference element 8-RE. The first position sensing element 8-S1, the second position sensing element 8-S2, and the third position sensing element 8-S3 are disposed on the carrying plate 8-12 and arranged along the optical axis 8-O direction (or the first direction 8-D1), wherein a first position sensing surface 8-SS1 of the first position sensing element 8-S1, a second position sensing surface 8-SS2 of the second position sensing element 8-S2 and a third position sensing surface 8-SS3 of the third position sensing element 8-S3 are arranged in the first direction 8-D1. In some embodiments, the first to third position sensing surfaces 8-SS1 to 8-SS3 are parallel or co-planar. The reference element 8-RE is disposed on the movable portion 8-30 (that is, the movable portion 8-30 carries a part of the position sensing assembly 8-S), and faces and corresponds to the first to third position sensing elements 8-S1 to 8-S3. Viewed in the first direction 8-D1 (or optical axis 8-O), the position sensing assembly 8-S is located between the two guiding members 8-RD. In a second direction 8-D2 that is perpendicular to the first directions 8-D1, the magnetic element 8-M overlaps the movable portion 8-30 and the position sensing assembly 8-S.

The movable portion 8-30 is driven by the drive assembly 8-MC, and can move relative to the fixed portion 8-10 in the limited range 8-A. The limited range 8-A includes a first range 8-A1, a second The range 8-A2 and a second range 8-A3 correspond to the first position sensing element 8-S1, the second position sensing element 8-S2, and the third position sensing element 8-S3, respectively. In the direction that is perpendicular to the optical axis 8-O (or in the second direction 8-D2), when the movable portion 8-30 is in the second range 8-A2 (8-A1, 8-A3) of the limited range 8-A, the movable portion 8-30 overlaps the position sensing element 8-S2 (8-S1, 8-S3) and the magnetic element M.

Referring to FIG. 2A, it is shown that the movable portion 8-30 is located in the second range 8-A2, and the second position sensing element 8-S2 corresponds the reference element 8-RE (which is disposed on the movable portion 8-30) in the second range 8-A2, to sense the position of the movable portion 8-30 relative to the fixed portion 8-10.

Figure 2B:
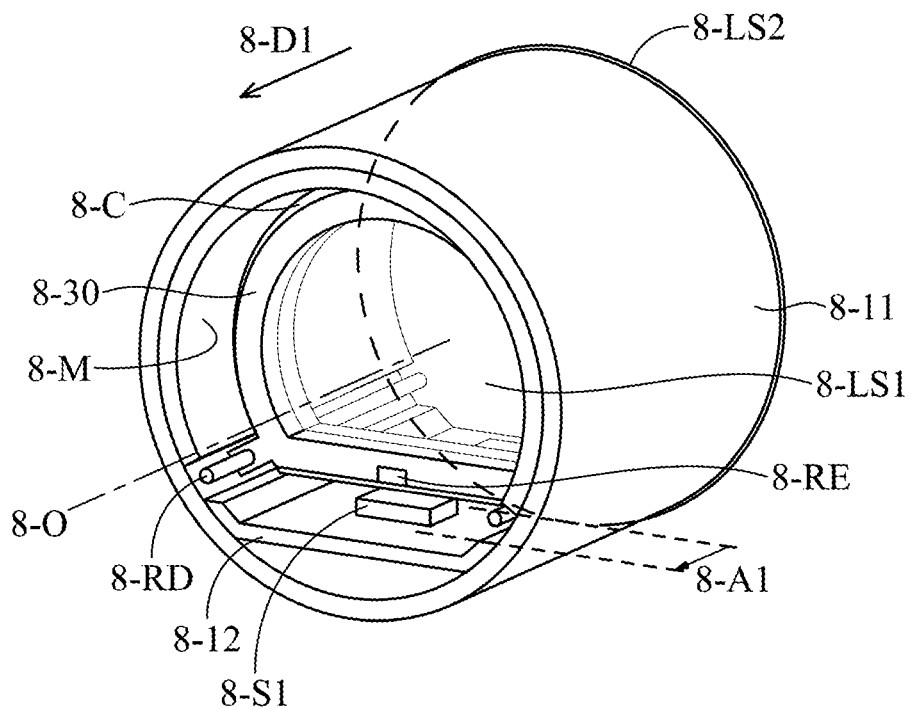
FIG. 2B is a schematic diagram of the movable portion and the first optical element moving in the first direction.

Referring to FIGS. 2A and 2B, they show the movable portion 8-30 moving in the first direction D1, which is moved from a position within the second range 8-A2 to a position within the first range 8-A1. In FIG. 2B, the first position sensing element 8-S1 corresponds to the reference element 8-RE (on the movable portion 8-30) in the first range 8-A1, thereby sensing the relative position of the movable portion 8-30 with respect to the fixed portion 8-10. When the movable portion 8-30 moves to the first range 8-A1, it is sensed by the first position sensing element 8-S1 which is also in the first range 8-A1, so that the position sensing accuracy for the moving portion 8-30 can be greatly improved. Compared with the case where only one position sensing element is provided, in this embodiment, a plurality of position sensing elements are provided in the first to third ranges 8-A1 to 8-A3, which can more accurately determine the position of the movable portion 8-30. In this way, zooming, autofocus or optical image stabilization functions are enhanced and improved.

Figure 2C:
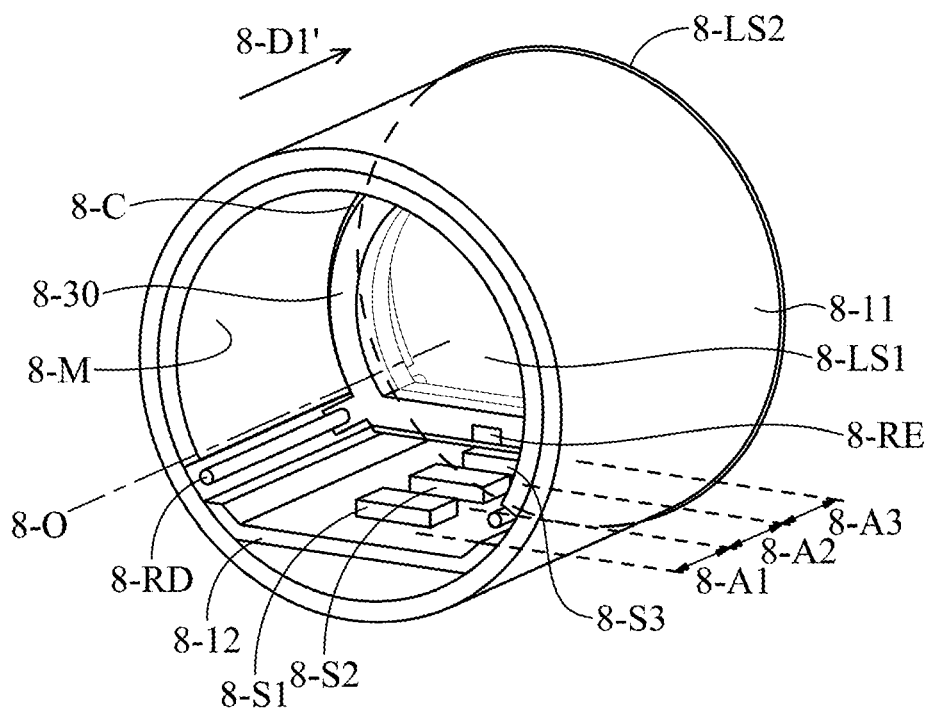
FIG. 2C is a schematic diagram of the movable portion and the first optical element moving along the direction that is reverse to first direction.

Referring to FIGS. 2A and 2C, it is a schematic diagram showing that the movable portion 8-30 moves in a direction 8-D1' that is the opposite of the first direction 8-D1, which moves from a position within the second range 8-A2 to a position within the third range 8-A3. The third position sensing element 8-S3 corresponds to the reference element 8-RE in the third range 8-A3, thereby sensing the position of the movable portion 8-30 relative to the fixed portion 8-10, in which the movable portion 8-30 moves to the third range 8-A3, it is sensed by the third position sensing element 8-S3 which is also in the third range 8-A3. The position sensing accuracy for the movable portion 8-30 is significantly improved.

Figure 2D:
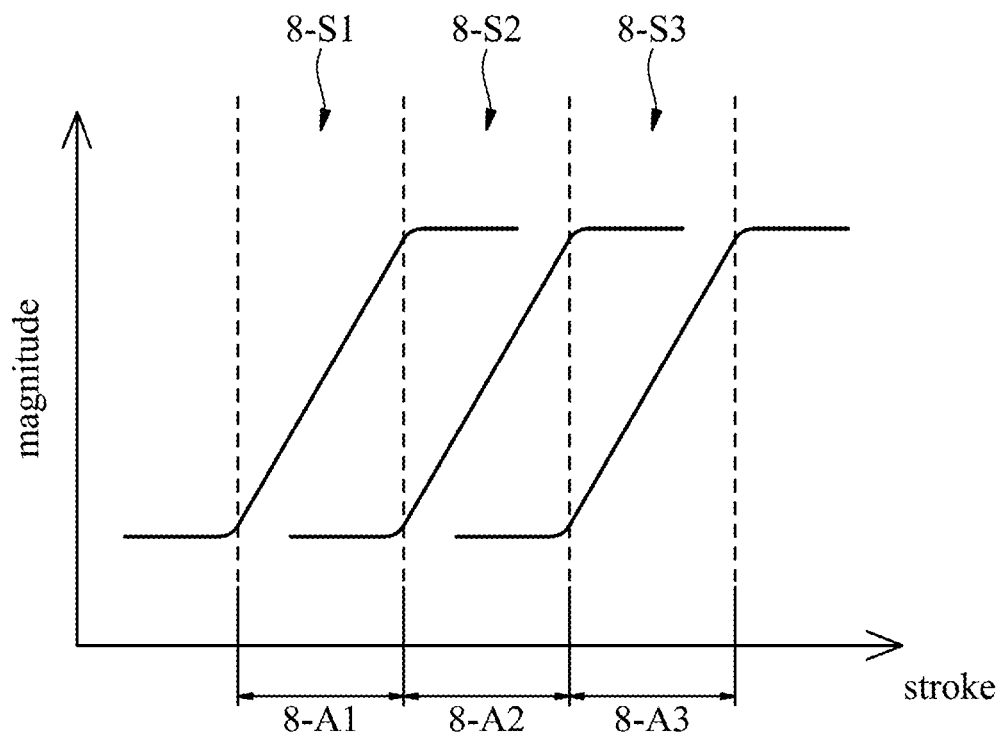
FIG. 2D is a schematic diagram showing the relationship between the moving stroke of the movable portion and the signal magnitude sensed or output by several position sensing elements.

By sensing the relative position of the movable portion 8-30 with respect to the fixed portion 8-10 by using different position sensing elements in different ranges as described above, the stroke of the movable portion 8-30 can be greatly increased. Refer to FIG. 2D, which shows the relationship between the movement stroke (X-axis) of the movable portion 8-30 and the signal magnitude (Y-axis) sensed by the position sensing elements 8-S1 to 8-S3. As shown in FIG. 2D, the signal magnitude sensed (or the signal magnitude output) by the three position sensing elements 8-S1 to 8-S3 in the first to third ranges 8-A1 to 8-A3 has a linear relationship with the stroke of the movable portion 8-30, but it has a non-linear relationship in the non-corresponding area.

For example, when the movable portion 8-30 moves within the first range 8-A1, the signal output by the first position sensing element 8-S1 and the moving stroke range of the movable portion 8-30 have a linear relationship (or substantially linear relationship); and when the movable portion 8-30 moves within the second range 8-A2, the signal output by the first position sensing element 8-S1 and the moving stroke range of the movable portion 8-30 are nonlinear relationship.

In another example, when the movable portion 8-30 moves within the second range 8-A2, the signal output by the second position sensing element 8-S2 and the moving stroke range of the movable portion 8-30 have a linear relationship (or substantially linear relationship); and when the movable portion 8-30 moves within the first range 8-A1, the signal output by the second position sensing element 8-S2 and the moving stroke range of the movable portion 8-30 are nonlinear relationship.

By reading the segments of the aforementioned linear relationship, in the case where the moving stroke of the movable portion 8-30 is increased, and the accurate sensing position of the movable portion 8-30 can still be provided. As a result, auto-focusing, zoom capabilities, and optical image stabilization of the device are greatly enhanced.

Figure 4:
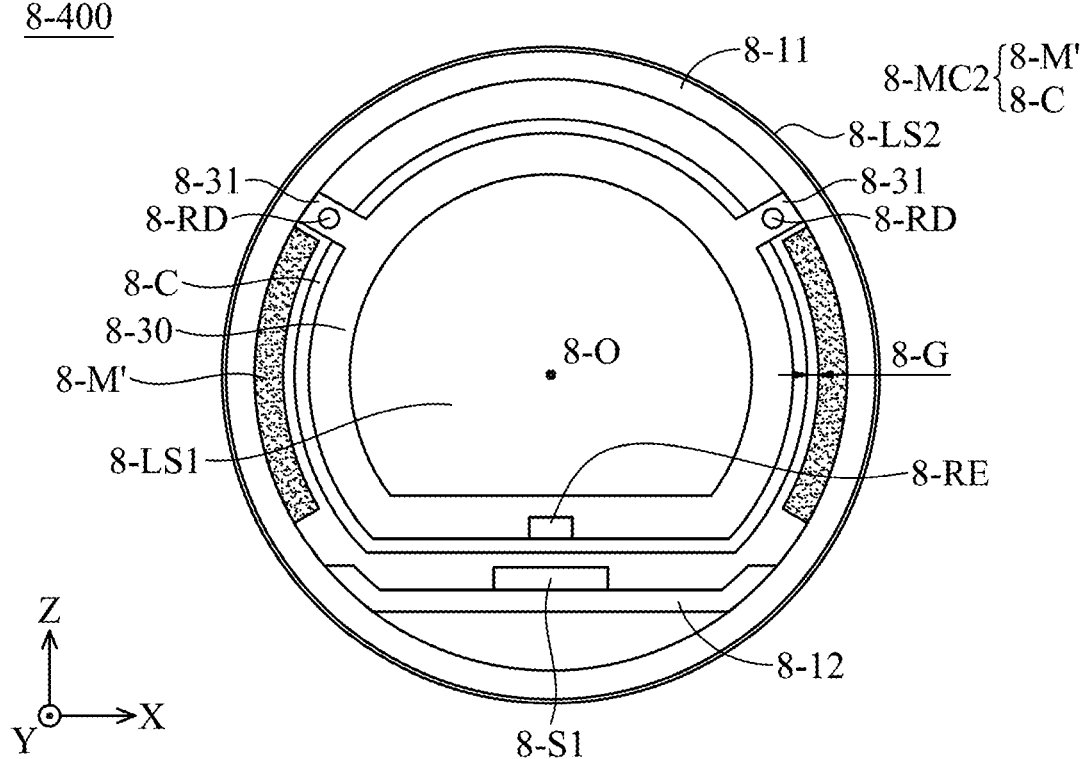
FIG. 4 is a schematic diagram of an optical driving mechanism according to another embodiment of the present invention.

FIG. 4 shows an optical driving mechanism 8-400 according to another embodiment of the present invention. In this embodiment, the main difference between the optical driving mechanism 8-400 and the optical driving mechanism 8-100 in FIGS. 1 and 3 is that the drive assembly MC2 of the optical driving mechanism 8-400 has a plurality of independent magnetic elements 8-M'. In the direction (X axis) that is perpendicular to the optical axis 8-O, two magnetic elements 8-M' are respectively disposed on both sides of the movable portion 8-30; and the guiding structure RD is disposed on the side of the movable portion 8-30 away from the position sensing assembly 8-S. The movable portion 8-30 is slidable on the guiding structure RD by the connecting member 31 located on the upper side of the movable portion 8-30 body (the side which is away from the position sensing assembly 8-S).

Each magnetic element 8-M' has an arcuate structure, and in a direction perpendicular to the optical axis 8-O (or the second direction 8-D2), the magnetic elements 8-M' are positioned between the guiding structure 8-RD and the position sensing assembly 8-S. The two magnetic elements 8-M' are symmetrical to each other (the YZ-plane as symmetry plane) and are attached to the housing 8-11, and correspond to the coil 8-C in common. A magnetic force is generated between the magnetic elements 8-M' and the coil 8-C, which can then drive the movable portion 8-30 relative to the fixed portion 8-10 to achieve the effect of zooming, preventing image shake or autofocus of the optical image.

Figure 5:
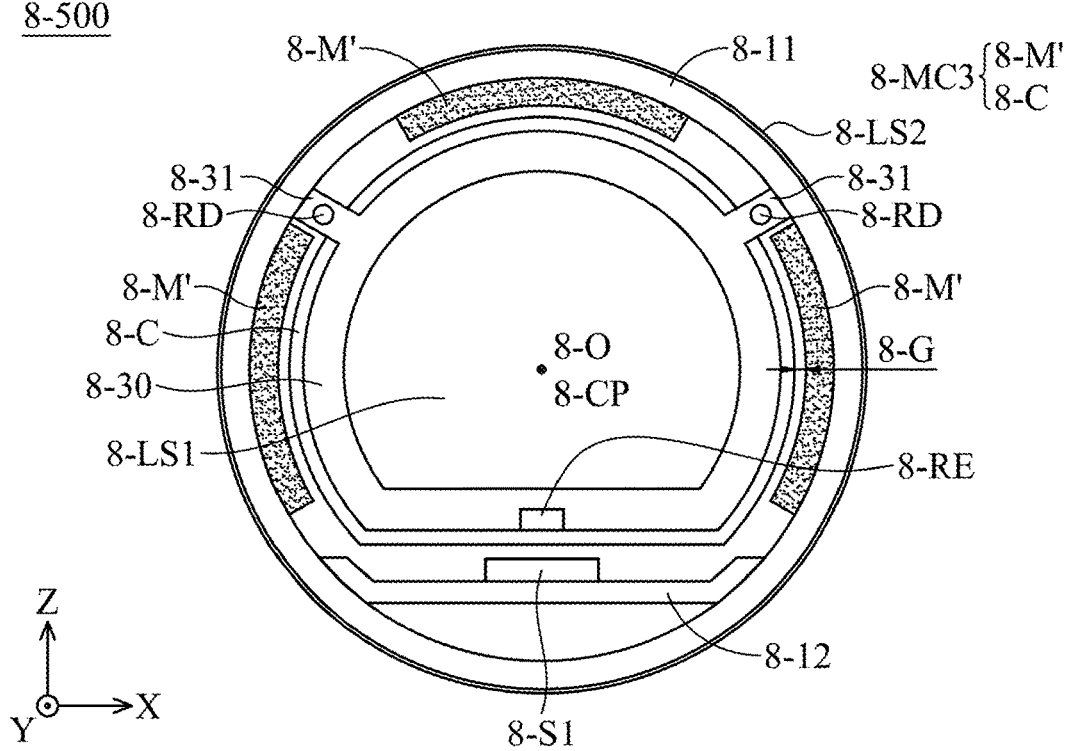
FIG. 5 is a schematic diagram of an optical driving mechanism according to another embodiment of the present invention.

FIG. 5 shows an optical driving mechanism 8-500 according to another embodiment of the present invention. In this embodiment, the main difference between the optical driving mechanism 8-500 and the optical driving mechanism 8-400 in FIG. 4 is that the drive assembly MC3 of the optical driving mechanism 8-400 has more (three) magnetic elements 8-M', including: two magnetic elements 8-M' provided on both sides of the movable portion 8-30, and another magnetic element 8-M' provided on the upper side of the movable portion 8-30.

In this embodiment, the three magnetic elements 8-M' are arranged around a center point 8-CP and surround the movable portion 8-30. In some embodiments, the central point 8-CP is overlapped with the optical axis O, so that the magnetic element 8-M' is disposed around the optical axis 8-O.

Figure 6:
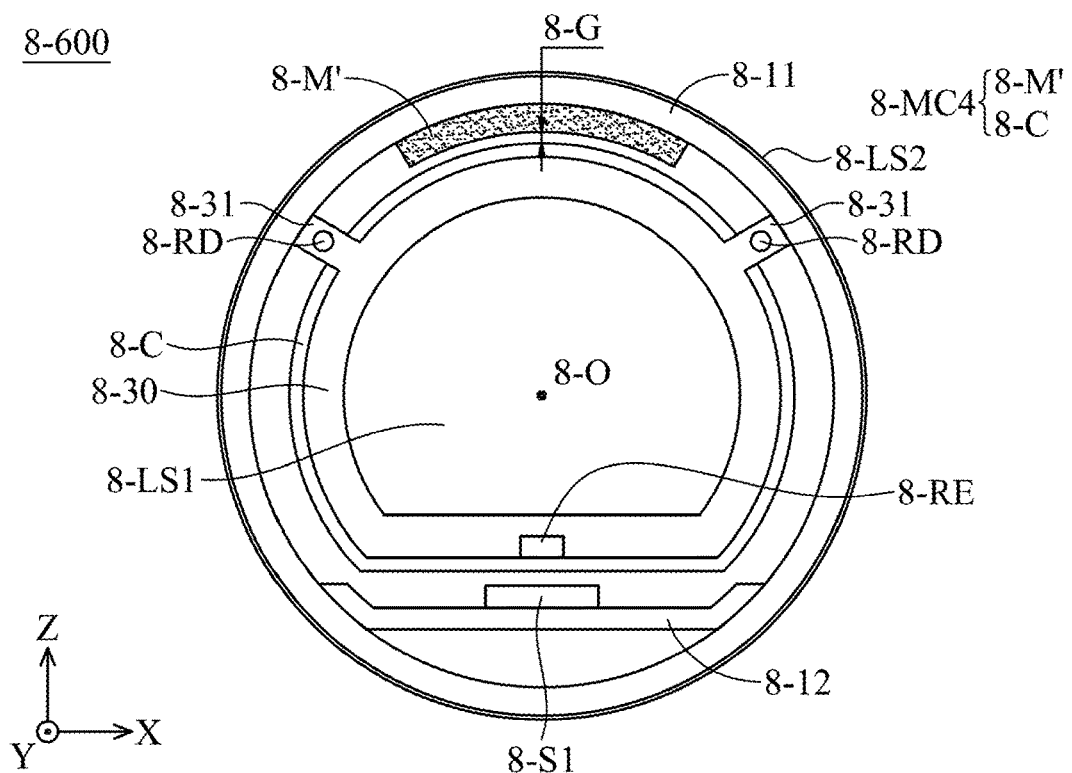
FIG. 6 is a schematic diagram of an optical driving mechanism according to another embodiment of the present invention.

FIG. 6 shows an optical driving mechanism 8-600 according to another embodiment of the present invention. In this embodiment, the main difference between the optical driving mechanism 8-600 and the optical driving mechanism 8-500 in FIG. 5 is that the drive assembly 8-MC4 of the optical driving mechanism 8-600 has one arc-shaped magnetic element 8-M', which is located on the upper part of the movable portion 8-30 and corresponds to the coil 8-C. In this configuration, the guiding structure 8-RD is located between the magnetic element 8-M' and the position sensing assembly 8-S when viewed from the second direction 8-D2 (Z axis). Compared to the magnetic element 8-M in FIG. 3, the magnetic element 8-M' in this embodiment is relatively small, which can reduce the amount of space taken up by the overall drive assembly 8-MC4 and it can also allow the drive assembly 8-MC4 to drive the movable portion 8-30 relative to the fixed portion 8-10.

It should be noted that in some embodiments, the optical driving mechanism 8-100 may not include the aforementioned second optical element 8-LS2. That is, the incident light passes through the first optical element 8-LS1 and then enters an image sensor to obtain images. In other embodiments, the optical driving mechanism 8-100 may include only one guiding member, which also can guide the movable portion 8-30 to move along the optical axis O or the first direction 8-D1 (or the reverse direction 8-D1').

In addition, in some embodiments, the position sensing assembly 8-S may include two, four, five, or another appropriate number of position sensing elements. The limited range may have two, four, five or any number of ranges, so long as they correspond to the number of sensing elements. One position sensing element corresponds to one range, and the position sensing element corresponds to the reference element 8-RE when the reference element 8-RE is in the range that corresponds to the position sensing element, in order to obtain the precise position of the movable portion 8-30 relative to the fixed portion 8-10.

In some embodiments, the reference element 8-RE of the position sensing assembly 8-S may be disposed in the coil 8-C (in a receiving portion, for example) that carries the reference element 8-RE. That is, the coil 8-C carries a part of the position sensing assembly 8-S. The reference element 8-RE faces the position sensing element 8-S1 (or 8-S2, or 8-S3).

In summary, an embodiment of the present invention provides an optical driving mechanism, including a fixed portion, a movable portion, a drive assembly, and a position sensing assembly. The movable portion is movably connected to the fixed portion and is configured to carry a first optical element. The drive assembly is configured to drive the movable portion relative to the fixed portion to move within a limited range that includes a first range and a second range. The position sensing assembly is configured to sense the movement of the movable portion relative to the fixed portion, and includes a reference element, a first position sensing element, and a second position sensing element. The first position sensing element corresponds to the reference element in the first range, and the second position sensing element corresponds to the reference element in the second range, wherein a first position sensing surface of the first position sensing element and a second position sensing surface of the second position sensing element are arranged in a first direction.

The embodiment of the present invention has at least one of the following advantages or effects, in that by the plurality of position sensing elements, the movable portion with the optical element can have a larger moving stroke, and the position of the movable portion can be accurately sensed. The adjustments between optical components, and image sensor modules, such as optical zooming, focusing and optical image stabilization, can be enhanced, more detailed and more accurate, greatly improving product quality.

Use of ordinal terms such as "first", "second", "third" etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An optical driving mechanism, comprising:
a fixed portion;
a movable portion, movably connected to the fixed portion and configured to carry a first optical element;
a drive assembly, configured to drive the movable portion relative to the fixed portion to move within a limited range, wherein the limited range includes a first range and a second range; and
a position sensing assembly, configured to sense the movement of the movable portion relative to the fixed portion, and including:
only one reference element;
a first position sensing element, corresponding to the reference element in the first range; and
a second position sensing element, corresponding to the reference element in the second range, wherein a first position sensing surface of the first position sensing element and a second position sensing surface of the second position sensing element are arranged in a first direction, and both the first position sensing element and the second position sensing element corresponds to the reference element;
wherein the drive assembly includes a magnetic element, and a coil, the magnetic element has an arched shaped structure, and the magnetic element has an opening which faces the position sensing assembly, the magnetic element and the coil correspond to each other, and a gap is between the magnetic element and the coil.

2. The optical driving mechanism as claimed in claim 1, wherein the fixed portion includes a second optical element, and the drive assembly is configured to drive the first optical element to move relative to the second optical element.

3. The optical driving mechanism as claimed in claim 2, wherein the fixed portion includes a guiding structure, the movable portion has a connecting member, and the guiding structure passes through the connecting member.

4. The optical driving mechanism as claimed in claim 3, wherein the connecting member abuts an inner wall of a housing of the fixed portion.

5. The optical driving mechanism as claimed in claim 3, wherein the connecting member is located on a lower side of a main body of the movable portion and includes two connecting sub-members, which are located on two sides of the main body of the movable portion and are adjacent to the position sensing assembly.

6. The optical driving mechanism as claimed in claim 3, wherein the connecting member is located on an upper side of a main body of the movable portion and includes two connecting sub-members, which are located on both sides of the main body of the movable portion and away from the position sensing assembly.

7. The optical driving mechanism as claimed in claim 2, wherein the fixed portion includes a guiding structure, and a magnetic element of the drive assembly is disposed between the guiding structure and the position sensing assembly.

8. The optical driving mechanism as claimed in claim 7, wherein the diving assembly further includes a plurality of magnetic elements, and the movable portion is located between the magnetic elements.

9. The optical driving mechanism as claimed in claim 2, wherein the drive assembly includes a plurality of independent magnetic elements, and the magnetic elements are arranged around a center point and around the movable portion.

10. The optical driving mechanism as claimed in claim 2, wherein the drive assembly includes a coil, and the coil carries a part of the position sensing assembly.

11. The optical driving mechanism as claimed in claim 2, wherein when the movable portion moves within the first range, the signal output by the first position sensing element has a linear relationship with the range of motion of the movable portion, and when the movable portion moves within the second range, the signal output by the first position sensing element has a non-linear relationship with the range of motion of the movable portion.

12. The optical driving mechanism as claimed in claim 11, wherein when the movable portion moves within the second range, the signal output by the second position sensing element has a linear relationship with the range of motion of the movable portion, and when the movable portion moves within the first range, the signal output by the second position sensing element has a non-linear relationship with the range of motion of the movable portion.

13. The optical driving mechanism as claimed in claim 2, wherein in a direction parallel to an optical axis of the optical driving mechanism, the first optical element is smaller in size than the second optical element.

14. The optical driving mechanism as claimed in claim 1, wherein the first direction is the direction in which the drive assembly drives the movable portion to move.

15. The optical driving mechanism as claimed in claim 1, wherein the fixed portion includes a guiding structure provided near the opening and configured to guide the movable portion relative to the fixed portion to move in the first direction.

16. The optical driving mechanism as claimed in claim 15, wherein the guiding structure has a plurality of guiding members configured to guide the movable portion relative to the fixed portion to move in the first direction, wherein the position sensing assembly is located between the guiding members when viewed from the first direction.

17. The optical driving mechanism as claimed in claim 15, wherein the magnetic element overlaps the movable portion and the position sensing assembly in a second direction that is perpendicular to the first direction.

18. The optical driving mechanism as claimed in claim 15, wherein the guiding structure has a plurality of elongated guiding members extending in the first direction and for guiding the movable portion to move relative to the fixed portion in the first direction, and at least part of the drive assembly is disposed between the guiding members.

19. The optical driving mechanism as claimed in claim 1, wherein the optical driving mechanism has an optical axis, and when the drive assembly receives a driving signal, the drive assembly drives the movable portion to move forward and backward along the optical axis.

20. An optical driving mechanism, comprising:
    a fixed portion;
    a movable portion movably connected to the fixed portion and configured to carry a first optical element;
    a drive assembly, configured to drive the movable portion relative to the fixed portion to move within a limited range, wherein the limited range includes a first range and a second range; and
    a position sensing assembly, configured to sense the movement of the movable portion relative to the fixed portion, and including:
    only one reference element;
    a first position sensing element, corresponding to the reference element in the first range; and
    and
    a second position sensing element, corresponding to the reference element in the second range,
    wherein a first position sensing surface of the first position sensing element and a second position sensing surface of the second position sensing element are arranged in a first direction,
    when viewed from the first direction, the first position sensing element overlaps the second position sensing element,
    both the first position sensing element and the second position sensing element correspond to the only one reference element,
    the size of the only one reference element is smaller than the size of the first position sensing element or the size of the second position sensing element.

* * * * *